(12) United States Patent
Sakita et al.

(10) Patent No.: US 8,059,146 B2
(45) Date of Patent: Nov. 15, 2011

(54) EXPOSURE DEVICE, IMAGE FORMING APPARATUS, AND COMPUTER-READABLE MEDIUM

(75) Inventors: Tomoaki Sakita, Kanagawa (JP); Atsushi Ugajin, Kanagawa (JP); Satoshi Kurashima, Kanagawa (JP); Kohei Shioya, Kanagawa (JP); Tetsuya Hori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 54 days.

(21) Appl. No.: 12/568,112

(22) Filed: Sep. 28, 2009

(65) Prior Publication Data

US 2010/0245527 A1    Sep. 30, 2010

(30) Foreign Application Priority Data

Mar. 25, 2009   (JP) .................................. 2009-073104

(51) Int. Cl.
   *B41J 2/435*   (2006.01)
   *B41J 2/47*    (2006.01)

(52) U.S. Cl. ........................................ 347/237; 347/247

(58) Field of Classification Search .......... 347/236–239, 347/246–247, 255
See application file for complete search history.

(56) References Cited

U.S. PATENT DOCUMENTS

| 7,224,380 B2 * | 5/2007 | Yamaguchi et al. .......... 347/247 |
| 2002/0122308 A1 | 9/2002 | Ikeda |
| 2004/0124788 A1 | 7/2004 | Ohmori |
| 2006/0023761 A1 * | 2/2006 | Moriyama ................. 372/38.02 |
| 2006/0133435 A1 | 6/2006 | Ikeda |

FOREIGN PATENT DOCUMENTS

| JP | 2002-335038 A | 11/2002 |
| JP | 2004-193376 A | 7/2004 |
| JP | 2005-059216 A | 3/2005 |

* cited by examiner

*Primary Examiner* — Hai C Pham
(74) *Attorney, Agent, or Firm* — Sughrue Mion, PLLC

(57) ABSTRACT

An exposure device includes a plurality of light emitting elements, a load, a first supplying unit and a second supplying unit. The first supplying unit supplies a driving current to one of (i) light emitting elements used to form an image among the plurality of light emitting elements and (ii) the load, in accordance with a modulation signal. The first supplying unit supplies a bias current to the other. The second supplying unit supplies the bias current to light emitting elements not used to form the image among the plurality of light emitting elements, regardless of the modulation signal.

3 Claims, 13 Drawing Sheets

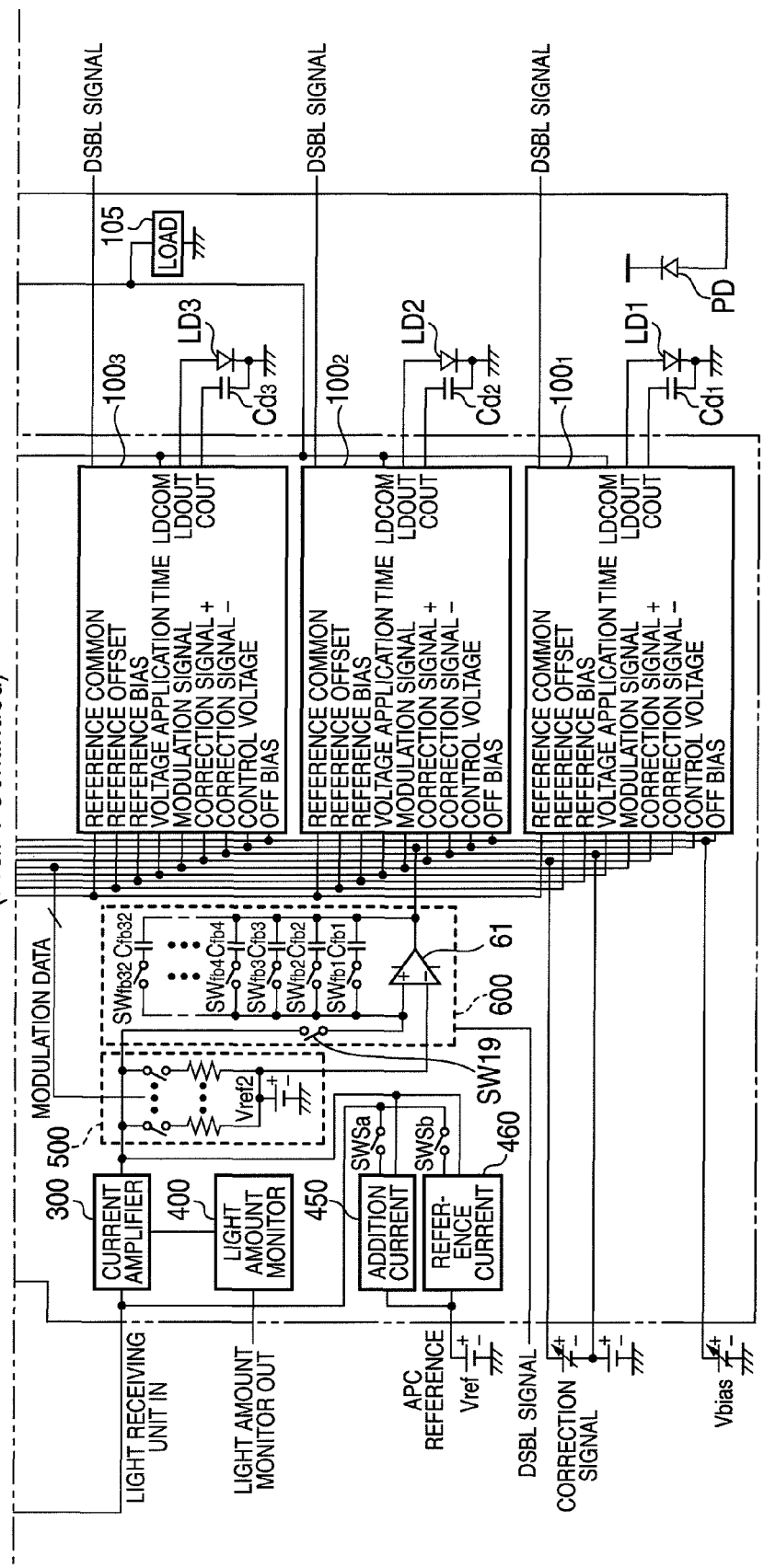

| LD1 | LD2 | LD3 | LD4 | LD5 | LD6 | LD7 | LD8 | POWER CURRENT W/ COMPLEMENTED | POWER CURRENT W/O COMPLEMENTED |
|---|---|---|---|---|---|---|---|---|---|
| ON | OFF | OFF | OFF | OFF | OFF | OFF | OFF | I1+I2+I3+I4+I5+I6+I7+I8 | I1 |
| ON | OFF | ON | OFF | ON | OFF | ON | OFF | I1+I2+I3+I4+I5+I6+I7+I8 | I1+I3+I5+I7 |
| ON | ON | ON | ON | ON | ON | ON | ON | I1+I2+I3+I4+I5+I6+I7+I8 | I1+I2+I3+I4+I5+I6+I7+I8 |

EXPOSURE DEVICE, IMAGE FORMING APPARATUS, AND COMPUTER-READABLE MEDIUM

CROSS-REFERENCE TO RELATED APPLICATIONS

This application is based on and claims priority under 35 USC 119 from Japanese Patent Application No. 2009-73104 filed Mar. 25, 2009.

BACKGROUND

Technical Field

The present invention relates to an exposure device, an image forming apparatus and a computer-readable medium storing a program that causes a computer to execute an exposure control process.

SUMMARY

According to an aspect of the invention, an exposure device includes a plurality of light emitting elements, a load, a first supplying unit and a second supplying unit. The first supplying unit supplies a driving current to one of (i) light emitting elements used to form an image among the plurality of light emitting elements and (ii) the load, in accordance with a modulation signal. The first supplying unit supplies a bias current to the other. The second supplying unit supplies the bias current to light emitting elements not used to form the image among the plurality of light emitting elements, regardless of the modulation signal.

BRIEF DESCRIPTION OF THE DRAWINGS

Exemplary embodiments of the invention will be described below in detail based on the accompanying drawings, wherein:

FIG. 6 is a circuit diagram showing the circuit configuration of a driver in the image forming apparatus according to the one exemplary embodiment of the present invention;

FIG. 8 is a view showing a relationship between statuses of the light emitting elements and currents corresponding thereto in the image forming apparatus according to the one exemplary embodiment of the present invention;

DETAILED DESCRIPTION

Hereinafter, exemplary embodiments of the present invention will be described.

Figure 1:
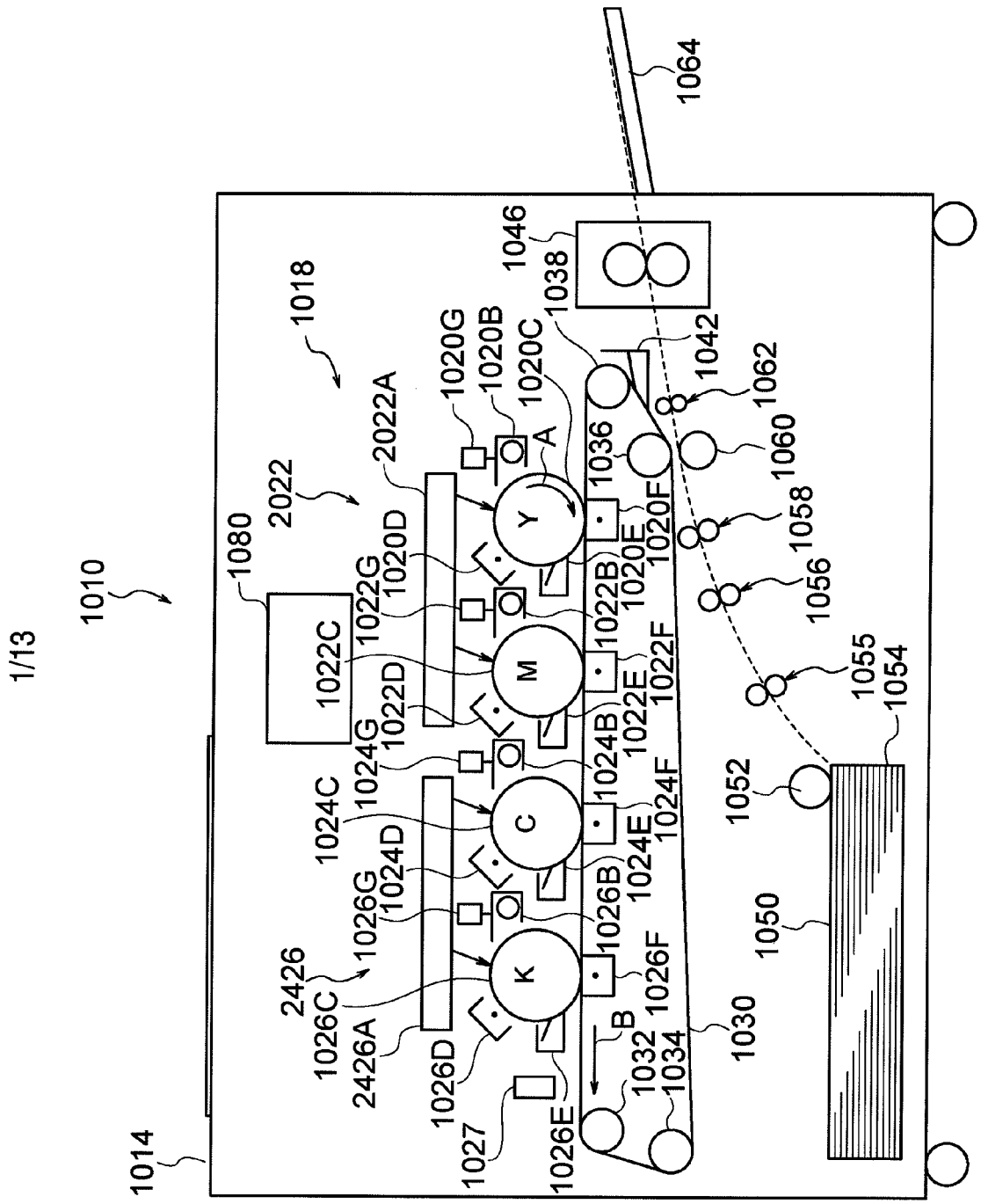
FIG. 1 is a schematic view showing the entire configuration of an image forming apparatus according to one exemplary embodiment of the present invention.

FIG. 1 is a schematic view showing the entire configuration of an image forming apparatus 1010 according to this exemplary embodiment.

The image forming apparatus 1010 is covered by a casing 1014. The image forming apparatus 1010 includes an image forming section 1018 and an image processing control section 1080 in the interior of the casing 1014. The image forming section 1018 forms color images on sheets. The image processing control section 1080 controls the entirety of image processing in the image forming section 1018.

The image forming section 1018 includes an intermediate transfer body 1030, a YM image forming unit 2022, a CK image forming unit 2426, a sheet conveyance path, conveyance rollers and a fixing device 1046. The intermediate transfer body 1030 serves as a recording medium that conveys, in a conveyance direction indicated by an arrow B in FIG. 1, a developing material which forms an image and which electrostatically absorbs thereto. The intermediate transfer body 1030 is a belt structure which travels around with being wound on rollers 1032, 1034, 1036 and 1038. The YM image forming unit 2022 forms a Y (yellow) color image and a M (magenta) color image. The CK image forming unit 2426 forms a C (cyan) color image and a K (black) color image. The YM image forming unit 2022 and the CK image forming unit 2426 are disposed in a tandem manner from the upstream side toward the downstream side along a conveyance direction (the direction of the arrow B shown in FIG. 1) of the intermediate transfer body 1030. The sheet conveyance path and conveyance rollers are configured to feed out a sheet 1050 from a sheet accommodation section 1054 and to convey the same. The fixing device 1046 performs a fixing process for the sheet onto which a toner image is transferred. Also, the image forming section 1018 includes a detection section 1027, serving as position detecting unit, on the downstream side of the CK image forming unit 2426 in the conveyance direction (the direction of the arrow B in FIG. 1).

The YM image forming unit 2022 is provided with an optical beam scanning device 2022A that is an exposure device common to Y and M colors. The optical beam scanning device 2022A emits Y-color laser light and M-color laser light which are modulated based on image data.

For the Y color, the YM image forming unit 2022 includes a photosensitive drum 1020C, a charging device 1020D, a developing device 1020B, a toner feeding part 1020G, a transfer device 1020F and a cleaning device 1020E. The charging device 1020D charges the photosensitive drum 1020C at a predetermined potential. The developing device 1020B develops a latent image formed by Y-color laser light output from the optical beam scanning device 2022A. The toner feeding part 1020G feeds a Y-color toner to the developing device 1020B. The transfer device 1020F transfers a yellow toner image from the photosensitive drum 1020C onto the intermediate transfer body 1030. The cleaning device 1020E removes toner from the outer circumferential surface of the photosensitive drum 1020C.

For the M color, the YM image forming unit 2022 includes a photosensitive drum 1022C, a charging device 1022D, a developing device 1022B, a toner feeding part 1022G, a transfer device 1022F and a cleaning device 1022E.

The CK image forming unit 2426 includes an optical beam scanning device 2426A serving as an exposure device common to C and K colors. The optical beam scanning device 2426A emits C-color laser light and K-color laser light, which are modulated based on image data.

For the C color, the CK image forming unit 2426 includes a photosensitive drum 1024C, a charging device 1024D, a developing device 1024B, a toner feeding part 1024G, a transfer device 1024F and a cleaning device 1024E. The charging device 1024D charges the photosensitive drum 1024C at a predetermined potential. The developing device 1024B develops a latent image formed by C-color laser light output by an optical beam scanning device 2426A. The toner feeding part 1024G feeds a C-color toner to the developing device 1024B. The transfer device 1024F transfers a C-color toner image from the photosensitive drum 1024C onto the intermediate transfer body 1030. The cleaning device 1024E removes toner from the outer circumferential surface of the photosensitive drum 1024C.

For the K color, the CK image forming unit 2426 includes a photosensitive drum 1026C, a charging device 1026D, a developing device 1026B, a toner feeding part 1026G, a transfer device 1026F and a cleaning device 1026E.

Scanning exposure of optical beams from the optical beam scanning device 2022A and the optical beam scanning device 2426A to the photosensitive drum 1020C, the photosensitive drum 1022C, the photosensitive drum 1024C and the photosensitive drum 1026C is carried out at predetermined intervals that are determined by a conveyance speed of the intermediate transfer body 1030 and distances between the photosensitive drum 1020C, the photosensitive drum 1022C, the photosensitive drum 1024C, and the photosensitive drum 1026C.

As shown in FIG. 1, a sheet accommodation section 1054 that accommodates sheets 1050 is provided below the intermediate transfer body 1030. An uppermost sheet 1050 of the sheet accommodation section 1054 is fed out to a sheet conveyance path by means of a feed-out roller 1052. A fed-out sheet 1050 is conveyed through the sheet conveyance path by the conveyance roller 1055, a conveyance roller 1056 and a conveyance roller 1058, and reaches the vicinity of the intermediate transfer body 1030.

A conveyance roller 1060 that faces the conveyance roller 1036 across the intermediate transfer body 1030 is provided on the sheet conveyance path. A color image that is formed by superimposing toner images of the respective colors on the intermediate 1030 is transferred onto the sheet 1050 when the sheet 1050 is conveyed through the facing part between the conveyance roller 1036 (in fact, the intermediate transfer body 1030) and conveyance roller 1060.

The sheet 1050 having the color image transferred thereon is conveyed to the fixing device 1046 by a conveyance roller 1062. After the sheet 1050 is subjected to the fixing process (heated and pressurized) by the fixing device 1046, the sheet 1050 is ejected to a sheet tray 1064.

Figure 2:
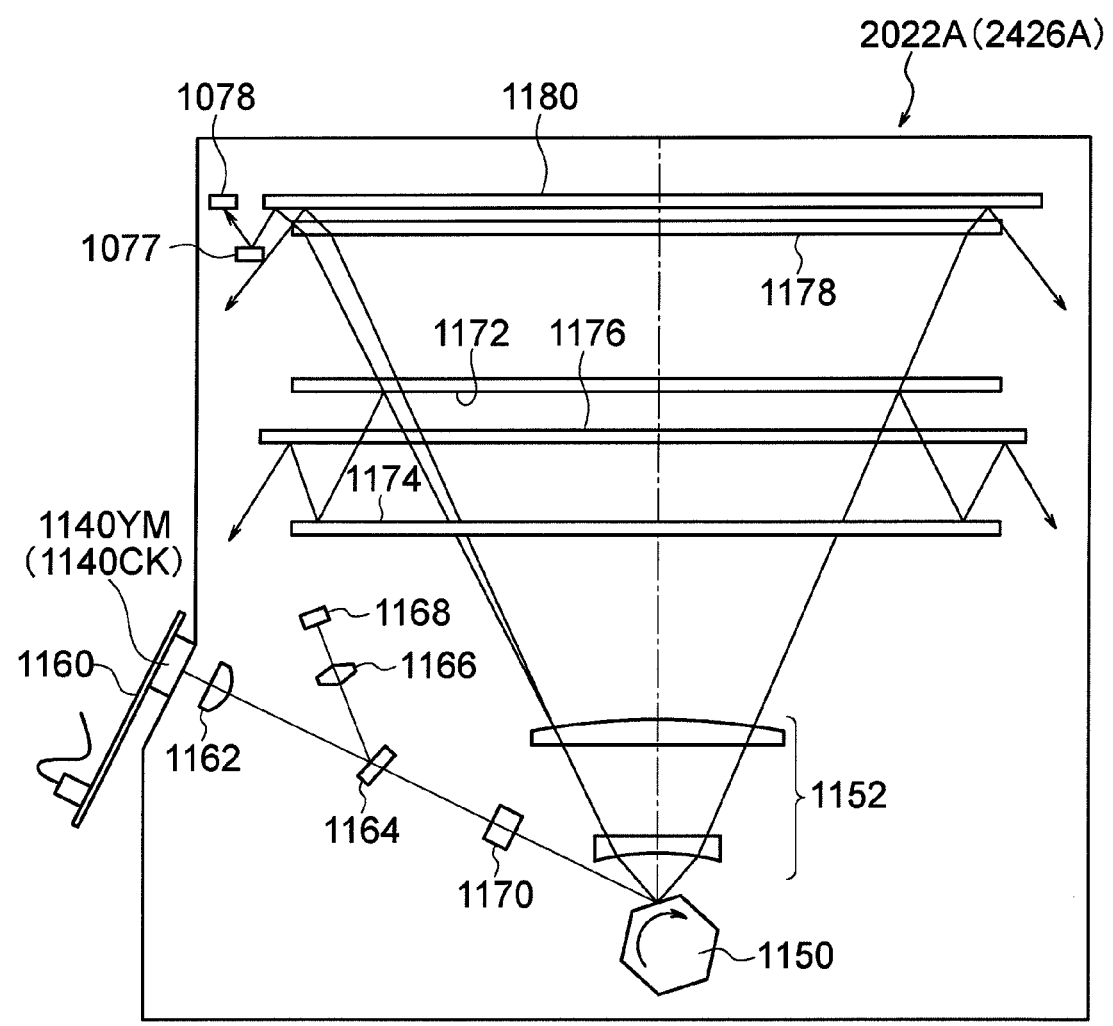
FIG. 2 is a view for explaining the configuration of an optical system of an optical beam scanning device in the image forming apparatus according to the one exemplary embodiment of the present invention.
Figure 3:
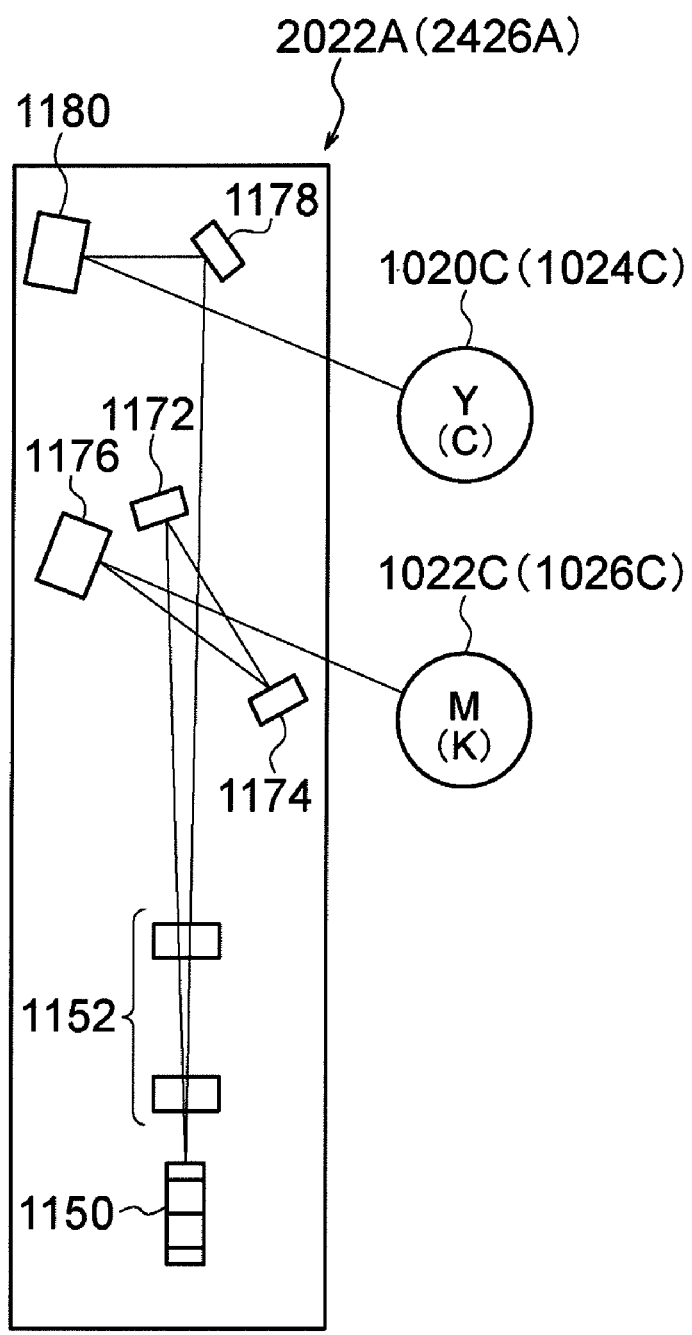
FIG. 3 is a view for explaining the configuration of the optical system of the optical beam scanning device in the image forming apparatus according to the one exemplary embodiment of the present invention.

FIG. 2 and FIG. 3 are views for explaining the configuration of an optical system of the optical beam scanning device 2022A.

The optical beam scanning device 2022A (the optical beam scanning device 2426A has a similar structure) has an optical system that causes plural optical beams simultaneously to be incident into a single rotary polygon mirror unit 1150 and guides the optical beams, which have passed through an fθ lens 1152, to the photosensitive drum 1020C for Y color and the photosensitive drum 1022C for M color (or the photosensitive drum 1024C for C color and the photosensitive drum 1026C for K color) which are shown in FIG. 3.

The rotary polygon mirror unit 1150 is an assembly composed of a polygon mirror having planar mirror surfaces on its circumference and a motor coupled with the rotation axis of the polygon mirror to rotate the polygon mirror at a high speed.

The optical beam scanning device 2022A of FIG. 2 corresponds to image data of yellow (Y) and magenta (M) colors. Also, the optical beam scanning device 2426A corresponds to image data of cyan (C) and black (K) colors.

A light source (laser light-emitting arrays) 1140YM (1140CK) attached to a circuit substrate 1160A has plural (e.g., thirty two) light emitting elements (details of which will be described later). As shown in FIG. 2, optical beams are emitted from the plural light emitting elements of the light source 1140YM (1140CK), pass through a collimator lens 1162 and are separated into reflection light and transmission light by a half mirror 1164.

The reflection light is input into a photo detector 1168 via a lens 1166, and is adjusted to a predetermined light amount in a light amount control (APC: Auto Power Control) which will be described in detail later.

Also, the transmission light, which passes through the half mirror 1164, is incident into the rotary polygon mirror unit 1150 via a cylindrical lens 1170, and reflection light thereof (scanning light) passes through the fθ lens 1152.

Here, a part of the optical beam passing through the fθ lens 1152 is incident into a cylindrical mirror for M (the cylindrical mirror for K) 1176 via a cylindrical mirror 1172 and a reflection mirror 1174, and is guided to the photosensitive drum 1022C (1026C).

Also, another part of the optical beam passing through the fθ lens 1152 is incident into a cylindrical mirror for Y (the cylindrical mirror for C) 1180 via a reflection mirror 1178, and is guided to the photosensitive drum 1020C (1024C).

At this time, the optical system is configured so that an optical beam of any one of the colors is incident into an SOS (Start of Scan) sensor 1078 via a reflection mirror 1077.

The laser light-emitting arrays 1140YM and 1140CK (hereinafter, which may be collectively referred to as a "laser light-emitting array 1140") are configured so that light emitting elements 2 serving as laser light sources are arranged in an array manner with plural light emitting elements being disposed in a main-scanning direction and with plural light emitting elements being disposed in a sub-scanning direction. The light emitting elements 2 are vertical cavity surface emitting laser diodes for forming latent images on the surfaces of the photosensitive drums 1020C, 1022C, 1024C, 1026C (hereinafter which may be referred to as a "photosensitive drum 1020C" representing the respective photosensitive drums).

Next, the circuit configuration of the optical beam scanning devices 2022A and 2426A which are an example of an exposure device will be mainly described.

Figure 4:
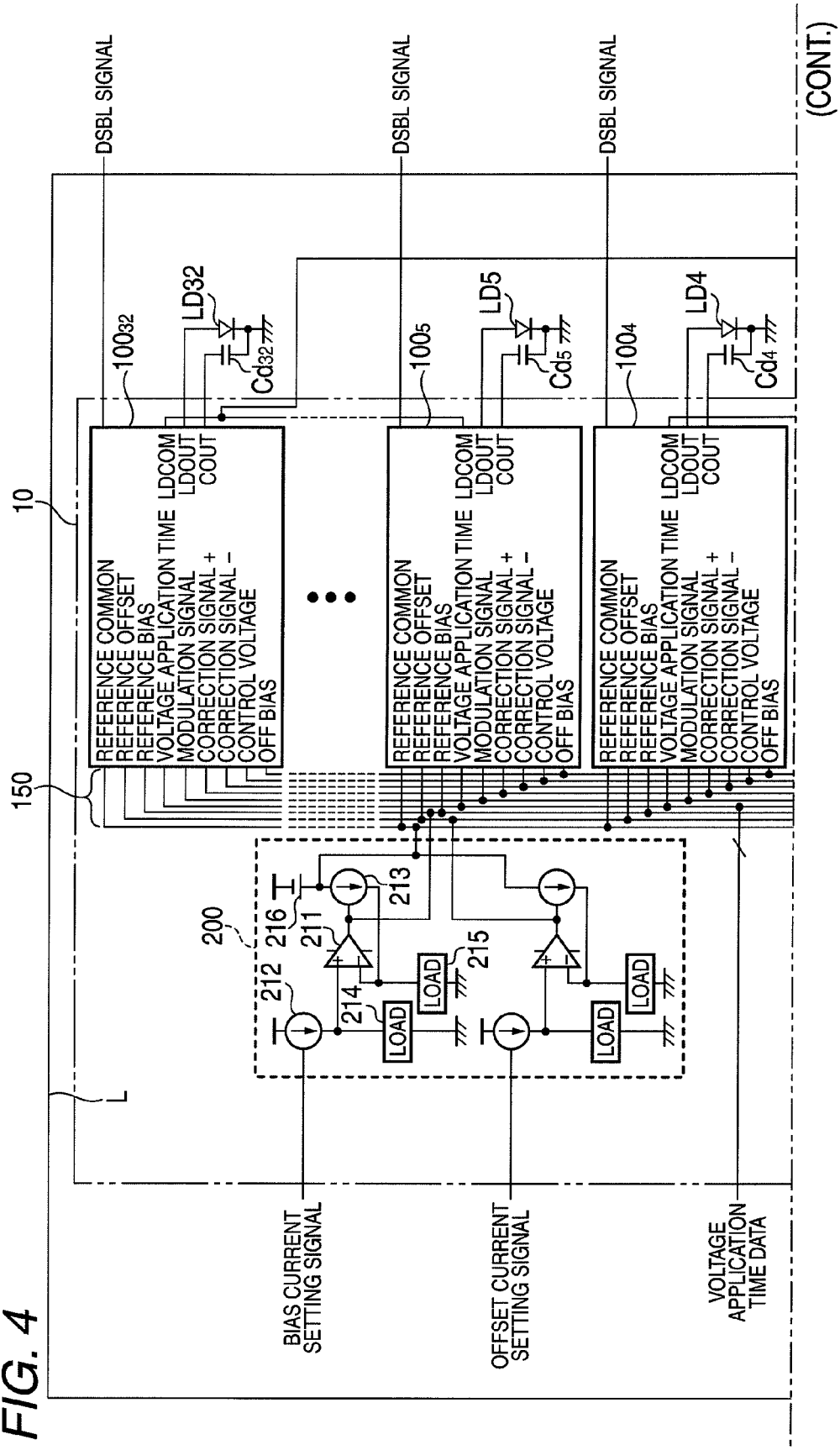
FIG. 4 is a circuit diagram of a light emitting element driving unit in the image forming apparatus according to the one exemplary embodiment of the present invention.

FIG. 4 is a view showing the entire configuration of a light emitting element driving unit 10 that is provided in each of the optical beam scanning devices 2022A and 2426A.

In FIG. 4, a light emitting element driving unit 10 drives plural light emitting elements and carries out the light amount control. In the configuration of FIG. 4, the light emitting element driving unit 10 drives thirty two light emitting elements LD1 through LD32. In other words, the light emitting element driving unit 10 has thirty two channels. The respective light emitting elements LD1 through LD32 are formed of vertical cavity surface emitting laser diodes (VCSEL) and are arranged in the matrix form. The light emitting element driving unit 10 is formed of, for example, IC chips, and is internally provided with circuits described below.

The light emitting element driving unit 10 includes drivers $100_1$ through $100_{32}$ for the respective channels, that is, for the respective light emitting elements LD1 through LD 32. Also, the light emitting element driving unit 10 has, as a control section common to the respective channels, a common control potential setting circuit 200, a current amplifier 300, a light amount monitor 400, a forced lighting circuit 500, and APC (automatic power control) circuit 600.

Drivers $100_1$ through $100_{32}$ receive signals from the common control section for the respective channels via a bus 150, and drive and control the respective light emitting elements LD1 through LD32. Specifically, the drivers $100_1$ through $100_{32}$ carry out APC (Auto Power Control) to control the light amount of the respective light emitting elements LD1 through LD32, and carrier out modulation control after the APC. As described later, in the APC, the drivers $100_1$ through $100_{32}$ control both voltage and current applied to the light emitting elements LD1 through LD32. When voltage driving is executed, the drivers $100_1$ through $100_{32}$ control, via terminals COUT, capacitors $Cd_1$ through $Cd_{32}$ which are connected to the cathode of the respective light emitting elements LD1 through LD32. When current driving is executed, the drivers $100_1$ through $100_{32}$ control, via respective terminals LDOUT, amounts of currents flowing into the respective light emitting elements LD1 through LD32.

The drivers $100_1$ through $100_{32}$ are commonly connected to each other by plural ones through terminal LDCOM. Also, the drivers $100_1$ through $100_{32}$ are connected to a load 105. In the configuration of FIG. 4, the terminals LDCOM of the drivers $100_1$ through $100_4$ are commonly connected to each other and are connected to one end of the load 105 having its other end connected to the ground. When the drivers $100_1$ through $100_{32}$ do not drive the light emitting elements corresponding thereto, the drivers $100_1$ through $100_{32}$ output current (complementary output) corresponding to the driving current. By causing a current to flow through the load 105, almost constant current flows through the light emitting element driving unit 10 without depending on the number of light emitting elements to be lit.

The light emitting element driving unit 10 carries out the modulation control after the amounts of laser light of the respective light emitting elements LD1 through LD32 are set to appropriate values by the APC. The outline of the APC is as follows. First, the amount of laser light of the light emitting element LD1 is adjusted. The driver $100_1$ drives the light emitting element LD1. Current in response to the amount of laser light of the light emitting element LD1 flows through a light-receiving unit PD (for example, photodiode, and being equivalent to the photo detector 1168) which is commonly provided for the light emitting elements LD1 through LD32.

When the current flows through the light-receiving unit PD, the current amplifier 300 turns on a switch SWSa, and receives a current, to which addition current from a current source 450 is added, at low impedance, for amplification. In this case, by turning on a switch SWSb, reference current supplied from a current source 460 counterbalances the addition current, supplies the remaining current to a resistor connected to a reference voltage $Vref_2$, and converts the current output by the current amplifier 300 into a voltage. Then, this voltage (which will be referred to as a "detection voltage") is output to the APC circuit 600 via the switch SW19. The APC circuit 600 is provided with an operational amplifier 61 and plural series circuits each having one switch (any one of SWfb1 through SWfb32) and one capacitor (any one of Cfb1 through Cfb32). The respective series circuits are connected between the output terminal of the operational amplifier 61 and an inverting input terminal. Each series circuit constitutes a sample-hold circuit. One sample-hold circuit corresponds to one light emitting element. For example, the sample-hold circuit having the switch SWfb1 and the capacitor Cfb1 corresponds to the light emitting element LD1. Similarly, the sample-hold circuit having the switch SWfb32 and the capacitor Cfb32 corresponds to the light emitting element LD32.

The operational amplifier 61 amplifies a differential voltage which is obtained when the light emitting element LD1 is driven, and outputs the amplified difference voltage to a corresponding signal line in the bus 150. The driver $100_1$ varies the driving current applied to the light emitting element LD1 so that the differential voltage becomes zero. Accordingly, the amount of laser light of the light emitting element LD1 changes, and the amount of current flowing through the light-receiving unit PD also changes. The detection voltage in response to the current flowing through the light-receiving unit PD is output from the current amplifier 300 to the APC circuit 600. By such feedback control, the addition current added to input and output of the current amplifier 300 is counterbalanced, and resultantly disappears, and the drive state of the light emitting element LD1 is set so that the amount of laser light corresponds to the reference current generated at the APC reference voltage Vref. In addition, "setting of the drive state" means that both the driving voltage applied to the light emitting element LD1 and the driving current are adjusted to values corresponding to the APC reference voltage Vref.

Thus, while controlling the light emitting element LD1, only the switch SWfb1 is turned on among 32 (thirty-two) sample-hold circuits of the APC circuit 600. The voltage which is obtained when the amount of laser light of the light emitting element LD1 is converged to the value equivalent to the APC reference voltage Vref is accumulated in the capacitor Cfb1. Hereinafter, similarly, APC is executed for the light emitting elements LD2 through LD32 in order one by one.

Further, as described later, the APC may be carried out two times. In the second time APC, the switch SWSa which is turned on in the first time APC is turned off. The counterbalance current supplied to the output side of the current amplifier 300 remains the same as the sum of the reference current plus the addition current. Therefore, the light-receiving current is controlled by the current corresponding to the reference current plus the addition current. Although 32 (thirty-two) sample-hold circuits in the APC circuit 600 may be commonly used in the first time APC and the second time APC, other 32 (thirty-two) sample-hold circuits may be provided for the second time APC.

The light amount monitor 400 outputs a light amount monitor signal, which shows the amount of laser light of the respective light emitting elements LD1 through LD32, based on the current flowing in the current amplifier 300.

The forced lighting circuit 500 generates a synchronization signal that is necessary before carrying out APC. In an image forming apparatus such as a copying machine, a printer and a facsimile machine, into which the light amount control unit 10 is incorporated, a light sensor is provided slightly before a image drawing start position in order to accurately determine a position on which an image is drawn, and determines the image drawing start position based on a timing when light output from the light emitting element crosses the light sensor.

In the optical system shown in FIG. 2, laser light emitted from the respective light emitting elements LD1 through LD32 are irradiated onto the photosensitive drums 1020C, 1022C, 1024C, and 1026C (hereinafter which may be referred to as "photosensitive drum 1020C" being representative of these drums) via the optical system which is described with reference to FIG. 2. And, the laser light repeatedly scan the surface of the photosensitive drum 1020C by rotation of the polygon mirror 1150. In addition, a part of the laser light emitted from the respective light emitting elements LD1 through LD32 are input into the SOS sensor 1078.

Figure 5:
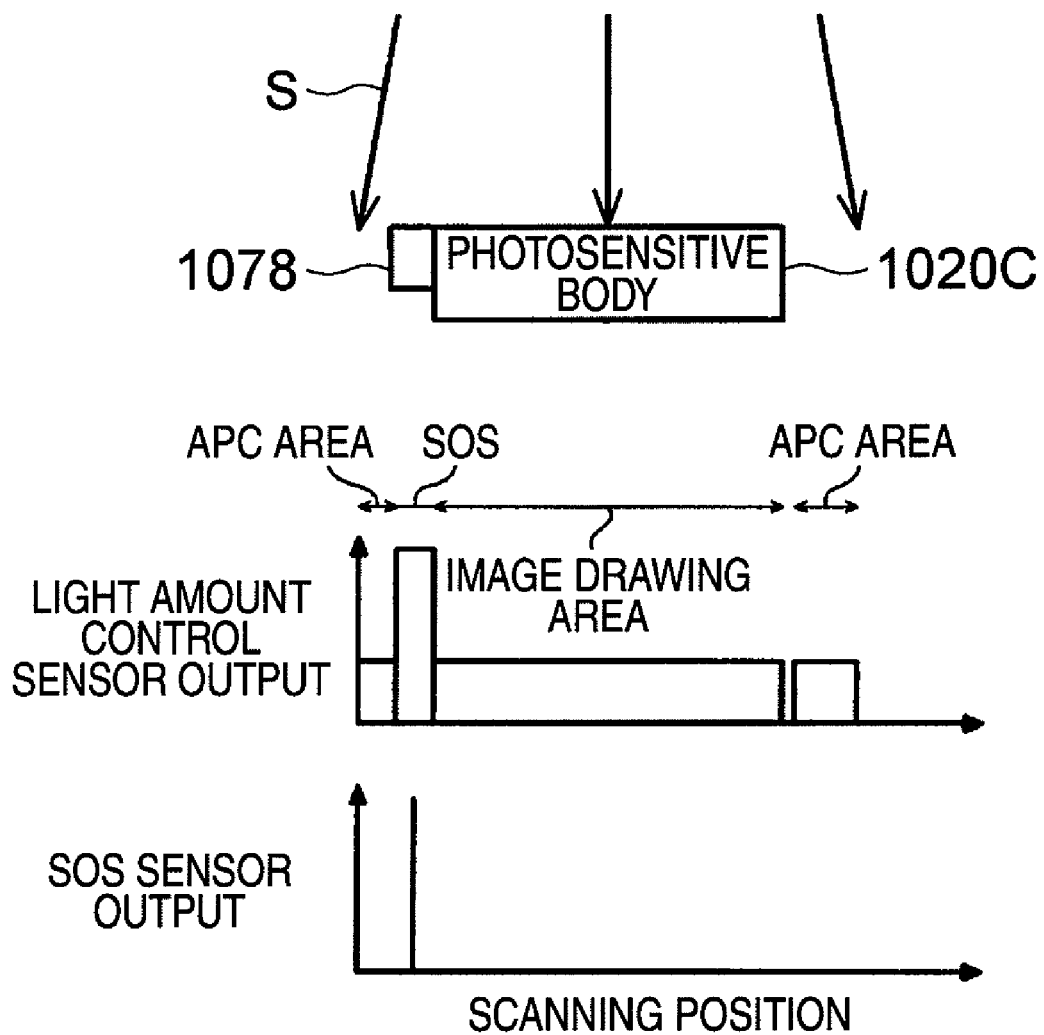
FIG. 5 is a schematic view for explaining exposure of a photosensitive body in the image forming apparatus according to the one exemplary embodiment of the present invention.

FIG. 5 shows outputs of the SOS sensor 1078, which receives laser light S at this time, as outputs of the light amount control sensor.

Herein, the outputs of the SOS sensor 1078, which is provided slightly before the image drawing start position, are shown as the outputs of the SOS sensor.

As described above, since the individual amounts of laser light of the light emitting elements LD1 through LD32 are small in comparison with a facet laser, the surface of the SOS sensor 1078 is scanned with plural light emitting elements being turned on simultaneously. In this case, only plural light emitting elements which are located in the middle part of the light emitting elements arranged two-dimensionally may be turned on. However, conditions (a gain of the feedback loop) are set by turning on the light emitting elements one by one in the APC. Therefore, there is a possibility that if a predetermined number of the light emitting elements are simultaneously turned on, the feedback loop of the APC might oscillate.

In this exemplary embodiment, the forced lighting circuit 500 varies a magnitude of the load of the current amplifier 300 in response to a modulation signal (modulation data). That is, a load in response to the number of light emitting elements to be turned on is connected to the output of the current amplifier 300. In the illustrated configuration, plural resistors are connected to the output of the current amplifier 300 via switches. From the perspective of the operational amplifier 61, the forced lighting circuit 500 lessens the current voltage conversion gain in response to the number of the light emitting elements to be turned on and causes the gain of the negative feedback not to change as the entirety. With this configuration, a state equivalent to a state where only one light emitting element is turned on at all times is achieved. In other words, the gain of the feedback becomes a value that is obtained in a state where only one light emitting element is turned on.

The common control potential setting circuit 200 generates control potentials that are used to generate various types of currents required in the respective drivers $100_1$ through $100_{32}$. In the configuration of FIG. 4, the common control potential setting circuit 200 is provided with a circuit for generating the common control potentials to set a bias current flowing in the drivers $100_1$ through $100_{32}$ and a circuit for generating a common potential to generate an offset current. The bias current and the offset current are only typical examples. The respective drivers $100_1$ through $100_{32}$ may set control potentials which are used to generate other currents required for driving and control. The common control potential for setting the bias current is generated in a circuit including an operational amplifier 211, current sources 212 and 213, and loads 214 and 215. The common control potentials for setting the offset current and the other currents are generated in similar circuits, respectively. The current source 212 supplies an instructed current to the load 214 in accordance with a bias current setting signal from the outside. A terminal voltage of the load 214 is given to a positive side terminal of the operational amplifier 211. The constant current source 213 connected to the constant voltage source 216 causes a current corresponding to the output of the operational amplifier 211 to flow through the load 215. A terminal voltage of the load 215 is given to a negative side terminal of the operation amplifier 211. The operational amplifier 211 controls the current source 213 so that the current source 213 causes the current to flow, which is the same as the bias current set by the bias current setting signal. At this time, an output signal of the operational amplifier 211 is output to a corresponding bus line in the bus 150. On the other hand, the positive side voltage of the constant voltage source 216 is output to a corresponding bus line in the bus 150. This bus line is common to the respective common control potentials, and is common to the respective drivers $100_1$ through $100_{32}$. Thus, the bias current value set from the outside is supplied to the drivers $100_1$ through $100_{32}$ via the bus 150 in the form of a differential voltage. As described later, the drivers $100_1$ through $100_{32}$ generate the bias current from the received differential voltage. As a result, even if a power source voltage of the constant voltage source 216 changes, the above-described potential difference becomes almost constant. Further, the output voltage of the operational amplifier 211 and the voltage of the constant voltage source 216 may be transmitted by two balanced lines.

Next, referring to FIG. 6, the internal configuration of the drivers $100_1$ through $100_{32}$ will be described. Since the respective drivers $100_1$ through $100_{32}$ are of the same structure, the drivers will be referred to as the "driver 100" with the suffixes of 1 through 32 omitted.

The driver 100 has two multipliers 21 and 22. The multiplier 21 is provided to control a current source 30, and the multiplier 22 is provided to control a corresponding one of the capacitors Cd1 through Cd32 shown in FIG. 4. Hereinafter, for the sake of convenience, it is assumed that the corresponding one capacitor is Cd, and the corresponding one capacitor is shown with a broken line in FIG. 6. The capacitor Cd functions as a voltage source for a short time during which the driving voltage applied to the laser rises. The current source 30 generates a current flowing through the corresponding light emitting element LD. The capacitor Cd functioning as the voltage source applies a driving voltage to the corresponding light emitting element LD.

Herein, a relationship between the driving current and the driving voltage (terminal voltage) of the vertical cavity surface emitting laser diode (that is, the voltage-current characteristics) is a proportional relation (linear relation) in a practical use range because the internal resistance of the vertical cavity surface emitting laser diode is high. Also, a relationship between the driving current and the amount of laser light is a proportional relation in the practical use range. Based on such characteristics, in the first time APC, the amount of current of the current source 30 is determined so that the amount of laser light of the light emitting element LD becomes a reference light amount (a first light amount), and, in the second time APC, the amount of current of the current source 30 is determined so that the amount of laser light becomes a second light amount. Similarly, in the first time APC, the driving voltage accumulated in the capacitor Cd is determined so that the amount of laser light of the light emitting element LD becomes the reference light amount (the first light amount), and, in the second time APC, the driving voltage accumulated in the capacitor Cd is determined so that the amount of laser light becomes the second light amount. By interpolation or extrapolation using these two values, the amount of laser light can be corrected to an optional light amount.

A 4-quadrant analog multiplier may be used as the multipliers 21 and 22, and a capacitor may be used as a voltage source to be connected to the multipliers. Inputs of the respective multipliers 21 and 22 may be composed of differential configuration. It is assumed that two differential inputs expressed by a positive sign (+) and a negative sign (−) of the respective multipliers 21 and 22 are V1a, V1b and V2a, V2b, respectively. In this case, the respective multipliers 21 and 22 of the differential configuration output currents expressed by "Iout=α(V1a−V1b)×(V2a−V2b)" where α denotes a constant. In such a laser driving unit, a correction signal is input to input terminals (multiplication terminal) of the respective multipliers 21 and 22, and a control voltage is input to the other input terminals (multiplicand terminal) of the multipliers 21 and 22. Usually, offset current exists where a positive side output of a complementary output of a multiplier composed of the differential configuration is utilized. However, even if offsets exist in the multipliers 21 and 22, the offsets at a time of the APC are cancelled by the capacitors C1 and C2 connected to the outputs of the respective multipliers 21 and 22. The correction signal is generated with a state where the amount of laser light differs depending on the scanning position of laser light being taken into consideration. The correction signal has a control voltage in response to the scanning position of the laser light.

First, the first light amount (to be made into the reference value) is set as follows by the first APC. The switch SWSa is set to ON, SASb to OFF, SW1 to OFF, SW2 to OFF, SW3 to OFF, SW5-1 to ON, SW5-2 to OFF, SW5-3 to OFF, SW5-4 to ON, SW6-1 to ON, SW6-2 to OFF, SW6-3 to OFF, SW6-4 to ON, SW7 to OFF, SW8 to ON, SW11 to ON, SW11-1 to ON, SW11-2 to OFF, SW12 to OFF, SW13 to ON, SW15-1 to OFF, SW15-2 to ON, SW16 to OFF, and switch SWSa is set to ON. Also, when the first light amount is set, a correction signal 0V is given to the multiplication terminals of the respective multipliers 21 and 22. In this state, since a multiplier factor is 0, the respective multipliers 21 and 22 output an offset voltage even if any control voltage is input into the multiplicand terminals. Also, the first APC reference voltage Vref1 is applied to the operational amplifier 61 of the APC circuit 600 shown in FIG. 4. The operational amplifier 61 outputs the control voltage so that the amount of laser light of the light emitting element LD becomes the first APC reference voltage Vref1. This control voltage is applied to the current source 30, via the switch SW8, the operational amplifier 26, an inverter 28 and the switch SW11 as shown in FIG. 6. The current source 30 applied to the light emitting element LD a current in response to the received control voltage. In addition, the control voltage output by the operational amplifier 26 is accommodated in the capacitor C3-1 of the sample-hold circuit. Since the correction signal is set to 0V, the multiplier 21 outputs an offset voltage. Therefore, the capacitor C1 is charged with a differential voltage between the control voltage and the offset voltage output from the multiplier 21. On the other hand, the control voltage output from the operational amplifier 61 of FIG. 4 is applied to the capacitor C2 and is accommodated in the capacitor C4-1 of the sample-hold circuit. Since the correction signal is set to 0V, the multiplier 22 outputs the offset voltage. Accordingly, the capacitor C2 is charged with the differential voltage between the control voltage and the offset voltage of the multiplier 22.

And, the second light amount (which will be referred to as "correction light amount") is set as follows by the second APC. The switch SW1 is set to OFF, SW2 to OFF, SW3 to OFF, SW5-1 to OFF, SW5-2 to ON, SW5-3 to ON, SW5-4 to OFF, SW6-1 to OFF, SW6-2 to ON, SW6-3 to ON, SW6-4 to OFF, SW7 to OFF, SW8 to OFF, SW11 to OFF, SW11-1 to ON, SW11-2 to OFF, SW12 to OFF, SW13 to ON, SW15-1 to OFF, SW15-2 to OFF, SW16 to OFF, and SWSa is set to OFF. Also, when the second light amount is set, a correction signal of a predetermined voltage is applied to the multiplication terminals of the respective multipliers 21 and 22. Further, since the switch SWSa is turned off, the operational amplifier 61 outputs a control voltage so that the light amount from the light-receiving unit PD is increased by the addition current of the current source 450 with respect to the first APC control. The control voltage is applied to the current source 30 via the switch SW8, the operation amplifier 26, the inverter 28, the switches SW5-2, SW5-3, multiplier 21, a resistor R11 and the capacitor C1 as shown in FIG. 6. The current source 30 varies, in accordance with the received control voltage, the current output from the light-receiving unit PD from the reference current to a current that is obtained by adding the addition current to the reference current. Also, the control voltage output from the operational amplifier 26 is accommodated in the capacitor C3-2 of the sample-hold circuit. The capacitor C1 is charged with a differential voltage between the above-described control voltage and the output of the multiplier 21. It is assumed that the current applied to the light emitting element LD in the first APC is "I". In this case, the current applied to the light emitting element LD in the second APC may be expressed to be "I+ΔI." On the other hand, the control voltage output from the operational amplifier 61 of FIG. 4 is applied to the capacitor C2 and is also accommodated in the capacitor C4-2 of the sample-hold circuit. The capacitor C2 is charged with a differential voltage between the control voltage and the output of the multiplier 22. It is assumed that the voltage accommodated in the capacitor C2 in the first APC is "V". In this case, the voltage accommodated in the capacitor C2 in the second APC may be expressed to be "V+ΔV."

Here, the switches SW6-1 and SW6-4 are turned on, and the switches SW6-2 and SW6-3 are turned off. However, in the second APC and thereafter, the switches SW6-3 and SW6-1 may be turned on, and the switches SW6-2 and SW6-4 may be turned off. In this case, improvement in accuracy can be expected because of the same condition as in modulation.

At the time of the modulation of the light emitting element LD, the correction voltage corresponding to the correction amount of light, which responds to the scanning position of laser light, is input into the multiplication terminals of the respective multipliers 21 and 22. Thereby, both (i) the driving voltage applied from the voltage source, which is composed of the multiplier 22, the capacitor C2 and the operation amplifier 26, to the vertical cavity surface emitting laser diode and (ii) the driving current supplied from the current source 30 to the light emitting element LD are simultaneously controlled, and the light emitting element LD emits light with the light amount, which is corrected in response to the scanning position of the laser light.

The resistor R11 is connected to the capacitor C1 in series. That is, in this exemplary embodiment, the sample-hold circuit including the capacitor C1 constitutes a low-pass filter. Also, a capacitor C11 is connected to this low pass filter in parallel. Similarly, by connecting a resistor R21 to the capacitor C2 in series, the sample-hold circuit including the capacitor C2 constitutes a low pass filter. Further, a capacitor C22 to prevent phase delay of a negative feedback loop is connected in parallel to the low pass filter composed of the capacitor C2 and the resistor R21.

A voltage application time adjustment circuit 800 adjusts a time during which a voltage is applied to the light emitting element LD, by controlling the switch SW2. This voltage is a voltage accumulated in the capacitor Cd. As described above, in this exemplary embodiment, the light emitting element LD is driven by controlling both the voltage and current applied to the light-emitting diode LD. When the light emitting element LD is driven, the light emitting element LD is first driven by a voltage and next driven by a current. Thus, the voltage application time of the voltage driving is adjustable.

The voltage application time adjustment circuit 800 has two sets of a delay circuit 81 and an exclusive logic sum circuit 82. The two delay circuits 81 are connected by an inverter 83 as illustrated. One delay circuit 81 receives a voltage application time signal and a modulation signal, and delays the modulation signal in response to the voltage application time signal. By obtaining an exclusive logic sum of the output signal of one delay circuit 81 and the modulation signal, the switch SW2 is turned on based on an output signal of the exclusive logic sum circuit 82. As a result, the output signal generate (i) a first pulse that rises along with a rise in the modulation signal and falls along with a rise in the delayed modulation signal and (ii) a second pulse that rises along with a fall in the modulation signal and rises along with a fall in the delayed modulation signal. That is, a voltage is applied, when the modulation signal rises and falls, with the same pulse width as the delay time of the delay circuit 81. The voltage application time is thus set. Similarly, since OFF bias is supplied by controlling the switch SW1 based on operation of the other delay circuit 81 and the other exclusive logic sum circuit 82, the light emitting element LD controls operation from ON to OFF (high speed is intended).

A current generation circuit 700 receives a differential voltage for each current output by the common control potential setting circuit 200 shown in FIG. 4, and generates a current in response to the differential voltage. An operation amplifier 34 and a constant current source 32 of the current generation circuit 700 receive the differential voltage formed between the reference common potential and the reference offset potential, and generate a offset current in response to the difference voltage. The offset current flows through a load 24 via a switch SW16. The terminal potential of the capacitor C2 is determined in response to the offset current. Thereby, the driving voltage applied to the light emitting element LD by the capacitor C2 functioning as the voltage source is adjusted. By adjusting the driving voltage, a drive pulse is overshot, and reproducibility of highlight can be enhanced by causing the laser to follow to a short pulse width. A profile of an image can be emphasized by setting the driving voltage to a slightly large degree. That is, by appropriately setting these factors based on an image, these factors can be used to adjust the image quality. An operational amplifier 35 and a current source 31 receive a differential voltage formed between the reference common potential and the reference bias potential via a switch 750, and generate a bias current in response to the differential voltage. In addition, the current source 31, which receives an OFF bias voltage set by a voltage source connected to the switch 750 in this figure generates a laser driving current in response to the OFF bias voltage. The bias current generated herein is a test current when the OFF bias voltage is determined. A period of time to determine the OFF bias voltage is provided before or after the APC. The test current is supplied to the respective lasers during this period of time via the switch SW15-1. The OFF bias voltage common to all the lasers is determined based on the respective laser terminal voltages. Furthermore, based on a current that flows when the determined common OFF bias voltage is applied to the laser terminal voltage, the value of the voltage source in the figure, which is connected to the switch 750, is set. The OFF bias current is controlled by the voltage source in the figure at the time of modulation.

Figure 6:
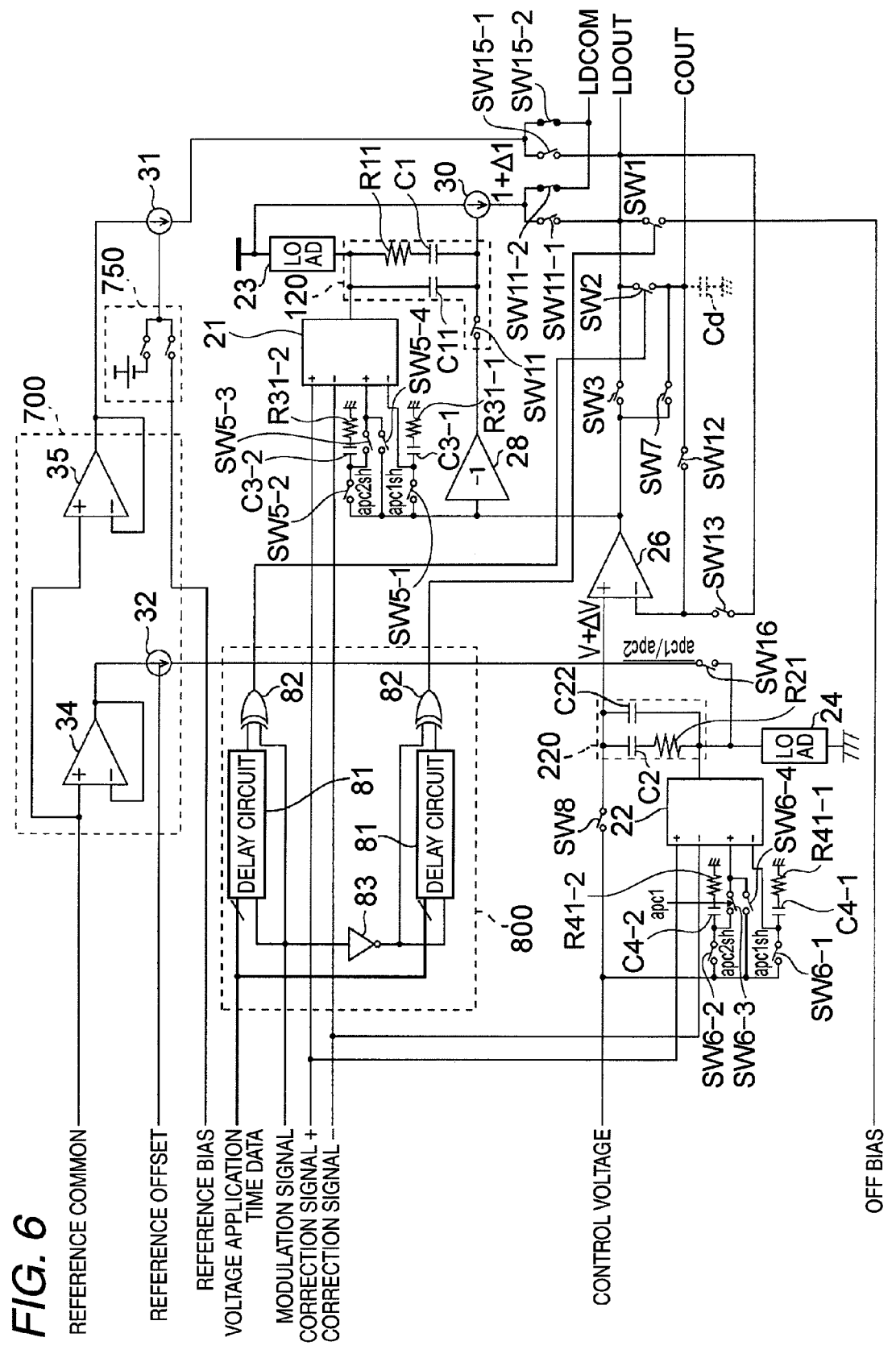
Figure 7:
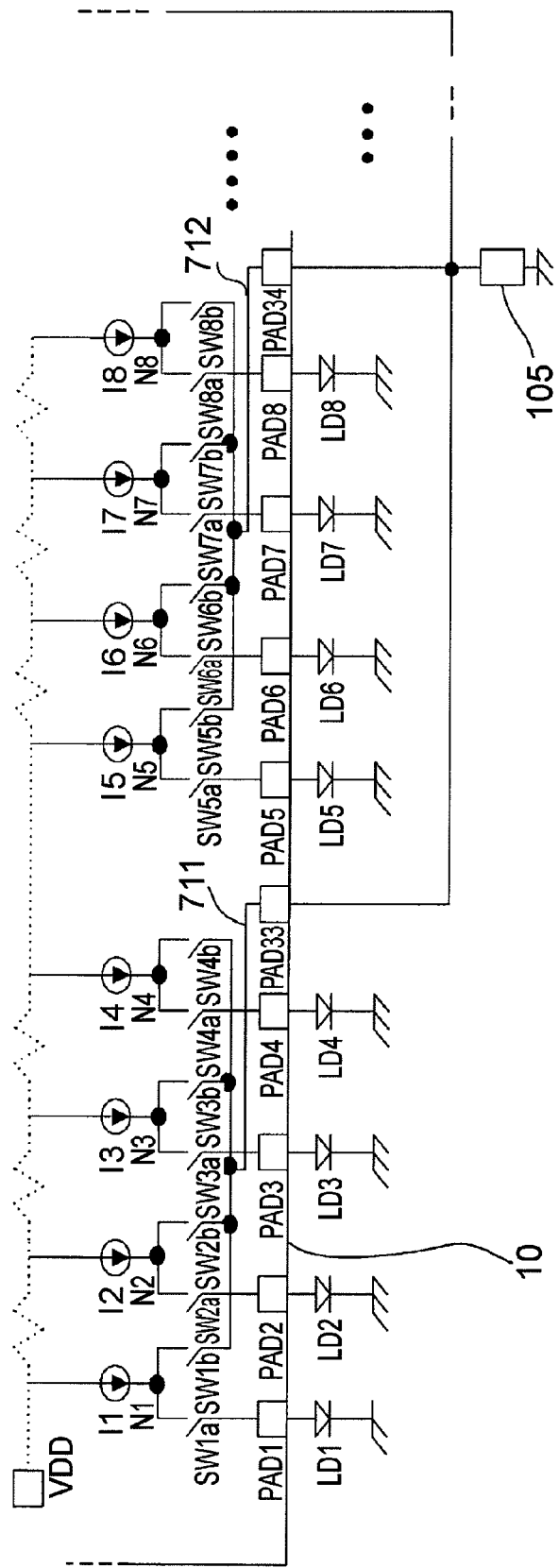
FIG. 7 is a circuit diagram showing a connection relationship between the light emitting element driving unit and light emitting elements in the image forming apparatus according to the one exemplary embodiment of the present invention.

FIG. 7 is a view showing details of a connection relationship between the light emitting element driving unit 10 and the light emitting elements LD1 through LD8, which are shown in FIG. 4 and FIG. 6.

As described above, in the light emitting element driving unit 10 of this exemplary embodiment, the drivers $100_1$ through $100_{32}$ are commonly connected to each other by plural ones through the terminal LDCOM. Also, the drivers $100_1$ through $100_{32}$ are connected to the load 105. In the configuration shown in FIG. 4, the LDCOM terminals of the driver $100_1$ through $100_4$ are commonly connected to each other, and are connected to the one end of the load 105 having the other end connected to the ground. When the drivers $100_1$ through $100_{32}$ do not drive the light emitting elements corresponding thereto, the drivers $100_1$ through $100_{32}$ output currents (complementary outputs) corresponding to the driving current. By causing this current to flow through the load 105, almost constant current flow through the light emitting element driving unit 10 without depending on the number of the light emitting elements to be lit.

In FIG. 7, the switches SW1a and SW1b correspond to the switches SW11-1 and SW11-2 (FIG. 6) inside the driver $100_1$ shown in FIG. 4. Similarly, the switches SW2a, SW2b through SW8a, SW8b correspond to the switches SW11-1 and SW11-2 (FIG. 6) inside the drivers $100_2$ through $100_8$, respectively. The switches SWna and SWnb complementarily operate, respectively. As illustrated, the switch SWna functions to apply to the light emitting element LD the driving current (current generated by the current source 30 in FIG. 6) for driving the light emitting element. The switches SW1b through SW4b are connected to a common line 711 and are connected to the outside load 105 via a terminal PAD33. Similarly, the switches SW5b through SW8b are connected to a common line 712 and are connected to the outside load 105 via a terminal PAD34. It is assumed that the switch SWna is a first switch and the switch SWnb is a second switch. In this case, the second switches SWnb are put together by plural ones via the common wiring, and are taken outside using a single terminal common thereto.

In this configuration, the terminals PAD33 and PAD34 may be connected to a middle part of the common wiring. A power voltage is supplied from a power terminal (VDD) to the respective drivers. A current constantly flows through the other drivers $100_9$ through $100_{32}$ (which are not shown). However, for simplification, description will be given on the assumption that the consumption current of the driving sections is determined by the output current value.

As shown in FIG. 8, if the light emitting element LD1 is turned on, the power current is constant without depending on the states of the light emitting elements LD2 through LD8, and a voltage drop resulting from a resistance of the power wiring becomes constant. Therefore, there is no characteristic fluctuation in the respective driving circuits due to power fluctuation in terms of DC. In addition, in FIG. 7, only a part of the light-emitting state is shown. The lighting states of the light emitting elements LD9 through LD32 are omitted.

Here, there is a possibility that the wiring resistance, which is commonly connected via the terminal PAD33, might transiently generate crosstalk between the light emitting elements. In order to reduce this possibility, the following configuration may be adopted. In addition, although the following description deals with the terminal PAD33, the same can be apply to the terminal PAD34.

First, the light amounts of the plural light emitting elements LD1 through LD32 are controlled (that is, subjected to the above-described APC) so that unevenness in the light amount is eliminated and that the light amounts become the reference light amount. As described above, the light amounts of the plural light emitting elements LD1 through LD32 are controlled by causing the respective light emitting elements LD1 through LD32 to emit light one by one. If the light emitting element LD1 is subjected to the APC, the switch SW1a is turned on, and the light emitting element LD1 is caused to emit light with the switches SWnb of the other light emitting elements LD2 through LD32 being turned on. And, as described above, the current I1 shown in FIG. 7 is determined. Next, the switch SW2a is turned on, and the light emitting element LD2 is caused to emit light with the switch SWnb of the other light emitting elements LD1 and LD3 through LD32 being turned on. And, similarly, the current I2 is determined. Thus, all the current values I1 through I32 are determined one after another. At this time, although the light emitting elements are caused to emit light one by one, the current value consumed in the drivers $100_1$ through $100_{32}$ becomes equal to the total sum of the respective driving currents.

Next, a print mode (modulation control) is started. In the print mode, the number of light emitting elements, which simultaneously emit light, changes in response to an image. However, since a current value corresponding to the driving current flows through the outside load 105 via the common wiring with respect to the light emitting elements, which do not emit light, the current value consumed in the drivers in the print mode becomes equal to the total sum of the respective driving currents as in the light amount control. Therefore, the amounts of light emitted in the print mode become equal to those set in the light amount control.

In this exemplary embodiment, a method for most reducing the number of terminals is to make all the complementary outputs common. However, if the number of the light emitting elements is great, the following phenomenon might occur. For example, it is assumed that thirty-two (32) light emitting elements LD1 through LD32 are provided, and that a current of 5 mA flows at maximum per light emitting element. In this case, a current of 160 mA will flow in the common complementary output line at maximum. In order to secure reliability, it is necessary to widen a wiring width, and a drawing area of the wiring will be increased in an LSI chip (the light emitting element driving unit 10). Also, although fluctuations in the power source can be seen due to a difference in changing time of the respective switches Sna and Snb, this might adversely influence the output characteristics if the number of commonly connected switches is great. Further, crosstalk might occur depending on a state of the switches connected to a common line, and the voltage of the nodes N1 through N4 shown in FIG. 7 might fluctuate. The voltage of this node corresponds to a start voltage where the light emitting elements are driven. By fluctuations of the start voltage, a rising waveform in the light emitting element changes, and this becomes wrinkles in an image.

Figure 9:
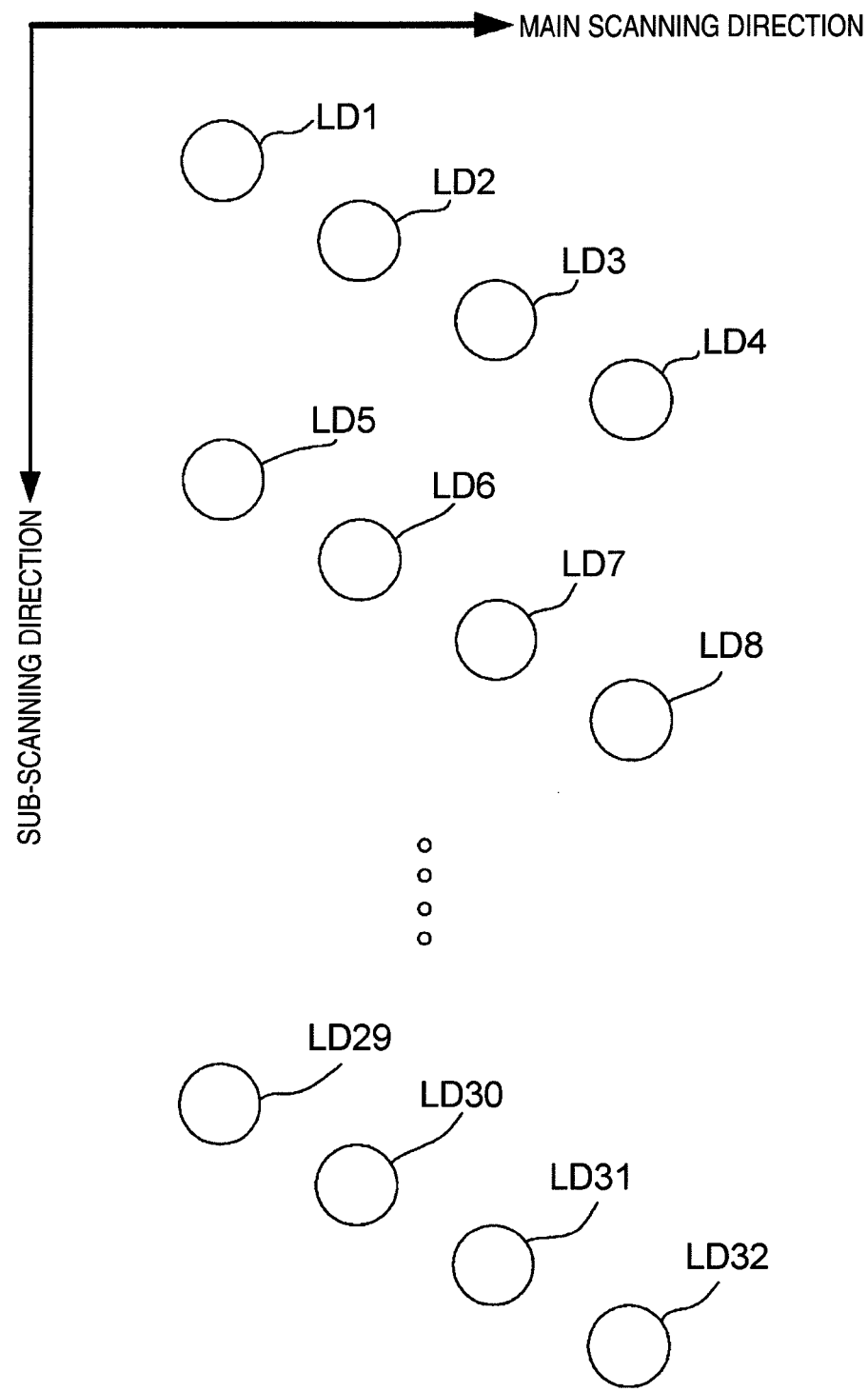
FIG. 9 is a view showing an example of arrangement of the light emitting elements in the image forming apparatus according to the one exemplary embodiment of the present invention.

In view of the above, the complementary outputs, which are made common, may be configured so that the number of main terminals is reduced to minimum so long as the characteristics thereof are not adversely influenced. Accordingly, first, thirty-two (32) light emitting elements LD1 through LD32 are divided into plural groups (or blocks), and the second switches SWnb are connected to each other group by group. In the example of FIG. 9, the light emitting elements are divided into eight groups four by four. For example, the light emitting elements LD1 through LD4 belong to the same group and are commonly connected to each other via the common line 711. That is, optical beams formed on the photosensitive body 1020C (FIG. 5) by the light emitting elements LD1 through LD4 connected to the first switches SW1a through SW4a corresponding to the second switches SW1b through SW4b belonging to the same group are arranged so as to be adjacent to each other. This common line 711 is connected to the terminal PAD33 for outside connection. If the thirty-two (32) light emitting elements LD1 through LD32 are arranged in an array state in which four light emitting elements are arranged in the main scanning direction and eight light emitting elements are arranged in the sub-scanning direction, as shown in FIG. 9, the scanning beams formed by the light emitting elements LD1 through LD4 of the same group are adjacent to each other in the sub-scanning direction. Similarly, the light emitting elements LD5 through LD9 belong to the same group and are commonly connected to each other via the common line 712. The scanning beams formed by the light emitting elements LD5 through LD9 are adjacent to each other in the sub-scanning direction. And, the common line 712 is connected to the terminal PAD34 for outside connection.

In the case of the above-described arrangement, connection positions where the common lines 711 and 712 are connected to the outside terminals PAD33 and PAD34 may be around the central part, which is made common. For example, connection with the terminal PAD33 is carried out in the vicinity of the central part of the common line 711. In other words, the signal line from the terminal PAD33 is connected to the vicinity of the central part of the common line 711.

Also, the plural light emitting elements may be divided so that the numbers of commonly connected second switches SWnb are equal to each other.

The number of divisions of the second switches SWnb is determined so that the spatial frequency of beams formed on the photosensitive body 1020C (FIG. 5) by the light emitting elements driven by the first switches each corresponding to the second switches SWnb, which are commonly connected to each other, becomes the spatial frequency or less which can be sensed by human eyes. Here, it is assumed that if when a frequency is the spatial frequency f (cycle/mm) or less, the frequency cannot be sensed by human eyes. In this case, the number of blocks is determined so that $f < 1000/(d \times n)$ is satisfied where d (μm) denotes a beam pitch and n denotes the number of blocks. So long as this condition is satisfied, even if fluctuations occur, the frequency of fluctuations of the exposure amount is not more than the frequency that can be sensed.

A relationship between the second switches SWnb and the light emitting elements LD may be determined so that the spatial frequency of beams formed on the photosensitive body 16 by the light emitting elements driven by the first switches each corresponding to the second switches SWnb, which are commonly connected to each other, becomes not more than the spatial frequency, which can be sensed by human eyes. That is, the first switches SWna and the second switches SWnb, which are not adjacent to each other, corresponding to light emitting elements, may be grouped, rather than grouping the first switches SWna and the second switches SWnb, which are adjacent to each other, as shown in FIG. 7. Further alternatively, the first switches SWna and the second switches SWnb, which are only partially adjacent, may be grouped.

Figure 10:
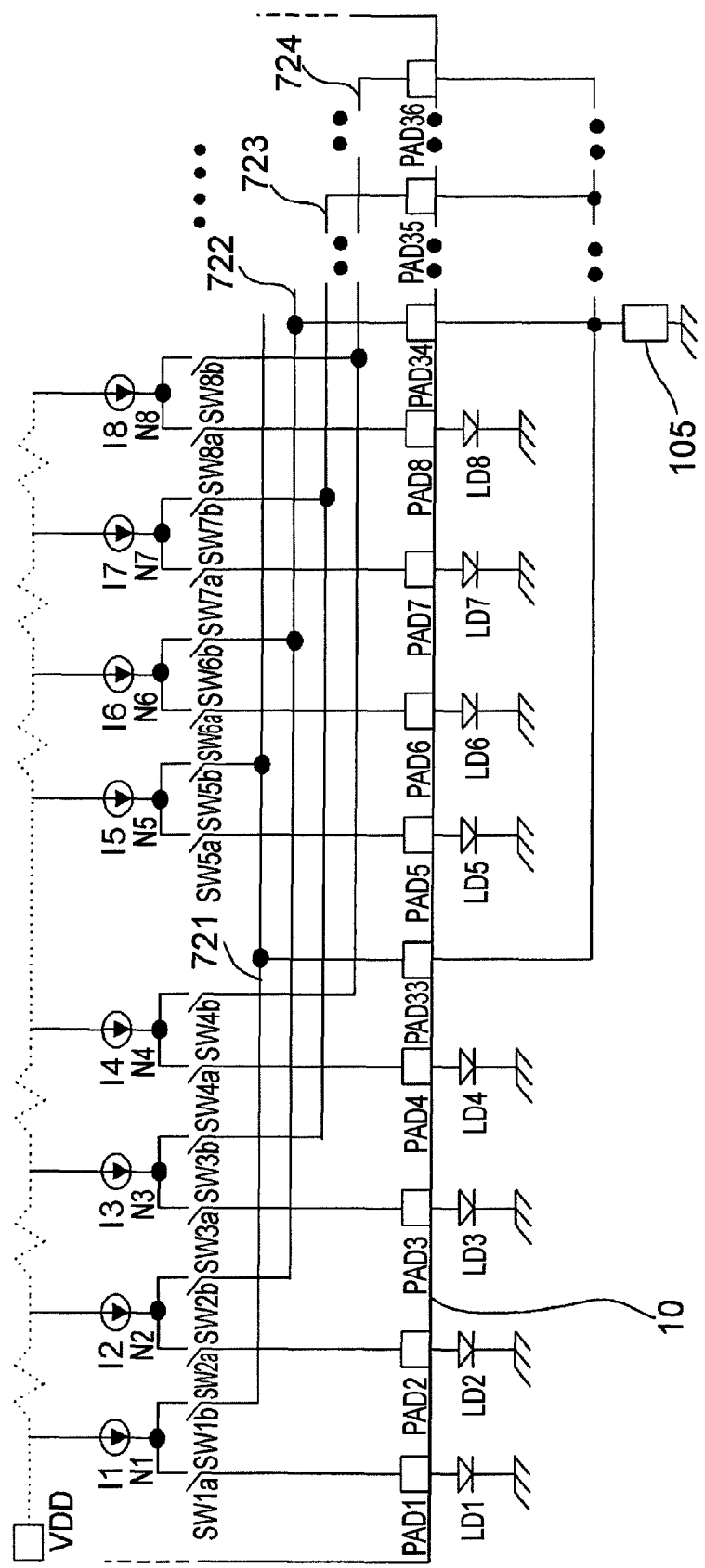
FIG. 10 is a circuit diagram showing another connection relationship between the light emitting element driving unit and the light emitting elements in the image forming apparatus according to the one exemplary embodiment of the present invention.

FIG. 10 is a view showing an example of another grouping.

In the grouping illustrated, the light emitting elements connected to the first switches SWna corresponding to the second switches SWnb belonging to the same group are arranged so that scanning rows formed by beams which are formed on the photosensitive body 1020C by the corresponding light emitting elements via a scanning device are not adjacent to each other. In the illustrated configuration, thirty-two (32) light emitting elements LD1 through LD32 are divided into four groups. Therefore, one group consists of eight light emitting elements. The thirty-two (32) light emitting elements LD1 through LD32 are arranged in eight rows by four columns as shown in FIG. 9. The eight rows are composed of LD1 to LD4, LD5 to LD8, . . . and LD29 to LD32, respectively. The four column are composed of LD1, LD5, LD9, . . . LD29; LD2, LD6, LD10, . . . LD30; LD3, LD7, LD11, . . . LD31; and LD4, LD8, LD12, . . . LD32, respectively. In this arrangement, the light emitting elements LD1 through LD32 are classified into four groups as shown below. For example, the light emitting elements LD1, LD5, LD9, LD13, . . . are classified into one group, and LD2, LD6, LD10, LD14, . . . are classified into another group. If such grouping is executed, the light emitting elements of the same group are not adjacent to each other in the row direction or the column direction. And, the corresponding second switches SWnb are grouped. In the above-described example, the second switches SW1b, SW5b, SW9b, SW13b, . . . are grouped, and are commonly connected to each other by a common wiring 721. Similarly, the second switches SW2b, SW6b, SW10b, SW14b, . . . are grouped, and are commonly connected to each other by a common wiring 722. Similarly, common wirings 723 and 724 are provided. And, the respective common wirings 721, 722, 723, and 724 are connected to connection terminals PAD33, PAD34, PAD35 and PAD36 corresponding thereto, respectively. These connection terminals PAD33, PAD34, PAD35 and PAD36 are connected to an outside common load 105. Even in such groupings, similar effect can be achieved to that in the case of grouping the second switches corresponding to the light emitting elements being adjacent to each other.

Also, even in the circuit shown in FIG. 7, a connection relationship that is substantially similar to the case shown in FIG. 10 can be achieved by changing the light emitting elements LD1 through LD32 connected to the pad PD1 through PD32. That is, the light emitting elements are connected to the pads PD1 through PD32 so that the respective light emitting elements LD1 through LD32 are not adjacent to each other on the array.

As described above, using the circuit shown in FIG. 7 or FIG. 10, the respective drivers $100_1$ through $100_{32}$ output the currents (complementary currents) corresponding to the driving current to the load 105 when not driving the corresponding light emitting elements.

This exemplary embodiment is provided with another circuit shown in FIG. 7 or FIG. 10. When the respective drivers $100_1$ through $100_{32}$ flow the driving current to the load 105 without flowing the driving current to the corresponding light emitting elements by the circuit, the bias current is flown through the light emitting elements. When the respective drivers $100_1$ through $100_{32}$ flow the driving current to the corresponding light emitting elements, the bias current is output to the load 105. That is, when the modulation signal (modulation data) is turned on based on image data for forming images with respect to a certain light emitting element (when an image is formed by the certain light emitting element), the driving current flows through the certain light emitting element, and the bias current flows through the load 105. On the contrary, when the modulation signal (modulation data) is turned off (when any image is not formed by the certain light emitting element), the bias current flows through the certain light emitting element, and the driving current flows through the load 105.

Also, as described above, a description has been given on the common control potential setting circuit 200 with reference to FIG. 4. However, generation of the bias current in the above-described common control potential setting circuit 200 is just for general and brief description of generation of the bias current. In this exemplary embodiment, the respective light emitting elements LD1 through LD32 are driven by a voltage and a current. Hereinafter, a description is given on a circuit regarding a voltage and current driving of the respective light emitting elements LD1 through LD32 provided in the light emitting element driving unit 10.

Figure 11:
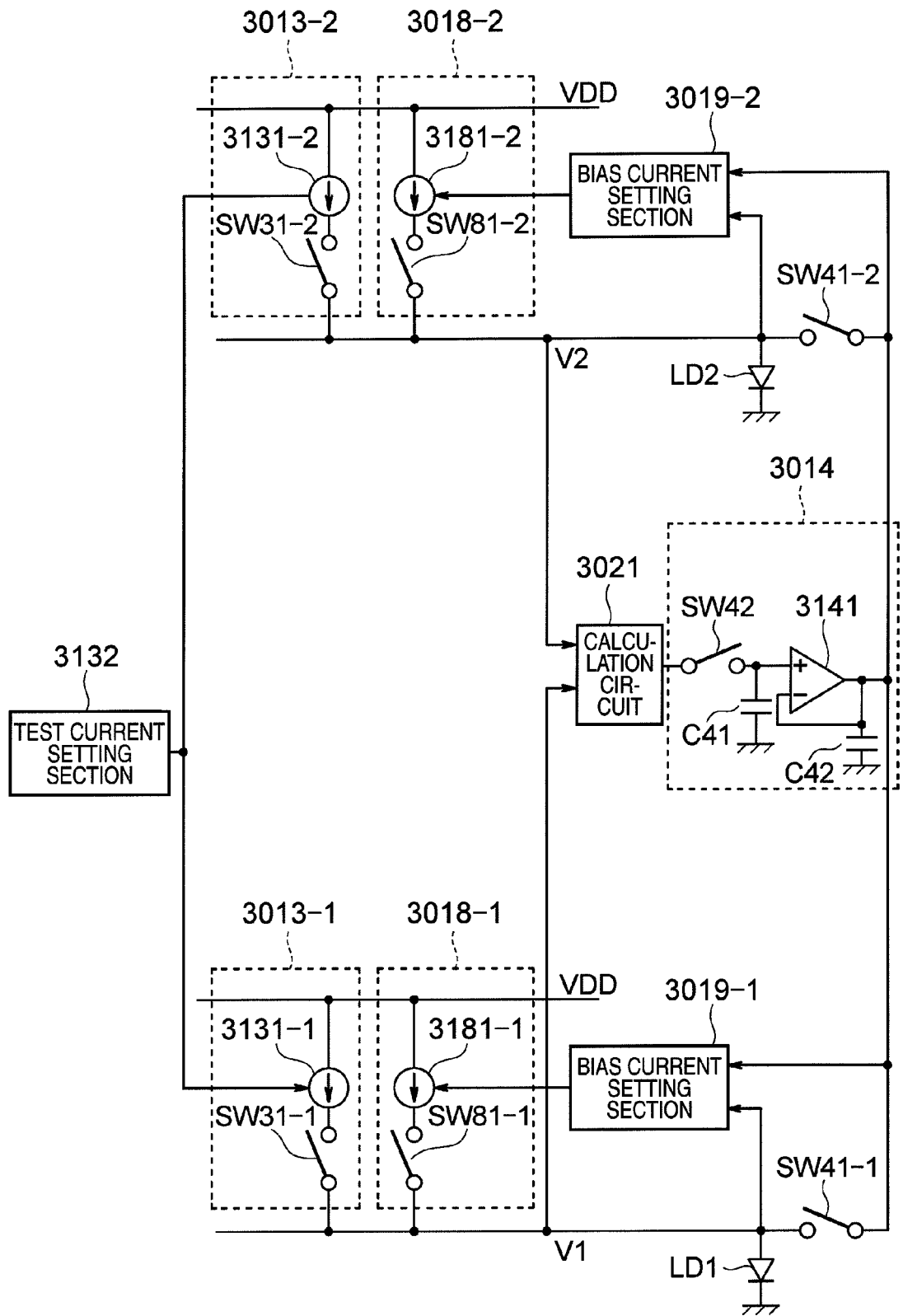
FIG. 11 is a circuit diagram pertaining to voltage and current driving of the respective light emitting elements in the image forming apparatus according to the one exemplary embodiment of the present invention.

FIG. 11 is a diagram of a circuit regarding the voltage and current driving of the respective light emitting elements LD1 through LD32 in this exemplary embodiment.

Although there are provided a large number of light emitting elements of vertical cavity surface light-emitting laser diodes, for simplification of the drawing, FIG. 11 only shows two light emitting elements LD1 and LD2 of the thirty-two (32) light emitting elements.

In FIG. 11, test current supplying circuits 3013-1, 3013-2, bias current supplying circuits 3018-1, 3018-2, and bias current setting sections 3019-1, 3019-2 are provided so as to correspond to the two light emitting elements LD1 and LD2, respectively. A test current setting section 3132 and a bias voltage setting circuit 3014 are commonly provided. In addition, the test current setting section 3132 may be provided for each of the test current supplying circuits 3013-1 and 3013-2. Further, in this exemplary embodiment, when the bias voltage Vbias is set by the bias voltage setting circuit 3014, calculation results of the respective terminal voltages of the two light emitting elements LD1 and LD2 may be used. Therefore, a calculation circuit 3021 is provided in the preceding stage of the bias voltage setting circuit 3014.

When a test current that is lower, preferably slightly lower, than the light emission threshold currents of the light emitting elements LD1, LD2 is supplied from the test current supplying circuits 3013-1, 3013-2 to the light emitting elements LD1, LD2, the calculation circuit 3021 carries out a calculation of, for example, "average value (V1+V2)/2" using the respective terminal voltages V1, V2 of the light emitting elements LD1, LD2. However, when a voltage value is calculated, the calculation is not limited to calculation of the average value but may be as a center value as possible in voltages values between the minimum value and the maximum value of the terminal voltages excluding the minimum value and the maximum value (in the fluctuation characteristic of the light emitting elements), such as a median or a mode.

The voltage value "(V1+V2)/2" being the result of calculation of the calculation circuit 3021 is given to the bias voltage setting circuit 3014. The bias voltage setting circuit 3014 samples the voltage value "(V1+V2)/2" by means of a switch SW42 and holds the same in a capacitor C41. The voltage held in the capacitor C41 is applied to the respective anodes of the light emitting elements LD1 and LD2 as the bias voltage Vbias by turning on switches SW41-1 and SW41-2 when the light emitting elements LD1 and LD2 are turned off.

The voltage held in the capacitor C41 is further supplied to the bias current setting sections 19-1 and 19-2. Each of the bias current setting sections 3019-1 and 3019-2 includes, for example, a differential amplifier and a sample-hold circuit. The bias current setting sections 3019-1 and 3019-2 perform the negative feedback control so that, when the light emitting elements LD1 and LD2 are turned off, the respective terminal voltages V1 and V2 of the light emitting elements LD1 and LD2 are coincident with the bias voltage Vbias set by the bias voltage setting circuit 3014, and sets respective currents of the current sources 3181-1 and 3181-2, that is, a bias current Ibias. With this configuration of the negative feedback control, for each of the light emitting elements LD1 and LD2, the terminal voltage of the light emitting element when the light emitting element is turned off is controlled so as to be coincident with the common bias voltage Vbias calculated.

Here, when the voltage and current driving (voltage driving→current driving) is carried out for the light emitting elements LD1 and LD2, first, the bias voltage Vbias of the voltage value "(V1+V2)/2" set by the bias voltage setting circuit 3014 is applied onto the anodes of the light emitting elements LD1 and LD2 via the switches SW41-1 and SW41-2 by turning on the switches SW41-1 and SW41-2 (voltage driving). After that, the bias current Ibias, which is set based on the bias voltage Vbias by the bias current setting sections 3019-1 and 3019-2, is supplied from the current sources 3181-1 and 3181-2 to the light emitting elements LD1 and LD2 by turning on switches SW81-1 and SW81-2 of the bias current supplying circuits 3018-1 and 3018-2 with the switches SW41-1 and SW41-2 being turned off (current driving).

In the case of the voltage and current driving, since the voltage value of the bias voltage Vbias corresponds to the current value of the bias current Ibias, which is set based on the corresponding bias voltage Vbias, the voltage values of the terminal voltages V1 and V2 of the light emitting elements LD1 and LD2 are quickly converged to a voltage value of the current driving when the voltage driving is changed to the current driving.

Herein, all of the thirty-two (32) light emitting elements of the vertical cavity surface light-emitting diodes in this example are not necessarily used for formation of an image at all times. For example, there are cases where some of the thirty-two (32) light emitting elements are not used and are in pause when an image is formed, such as the case where all of the thirty-two (32) light emitting elements are used when an image formed at a high speed using only black toner of a single color, and a part of the thirty-two (32) light emitting elements are used when a full-color image is formed.

In this case, as shown in FIG. 4, a disable signal (DSBL signal) is output to the APC circuit 600 of the light emitting element driving unit 10 to cause a part of the switches SWfb1 through SWfb32, which correspond to the light emitting elements to be brought into pause, to be opened. Thereby, the APC is not carried out for the light emitting elements to be brought into pause.

However, even if the APC is not carried out for the light emitting element to be brought into pause, this means only that no APC is executed, and it is not clear how much holding voltages for the light emitting elements, which are brought into pause, are due to non-execution of the APC. There is a possibility that the light emitting elements which should pause might hold some holding voltage because of crosstalk between modulation data or crosstalk caused by disturbance and might emit light. If the light emitting element which should pause emits light, the quality of the image to be formed might deteriorate. Accordingly, the light emitting elements to be brought into pause are devised so as not to emit any light without fail in order to prevent the image quality from deteriorating.

Also, as described with reference to FIG. 11, for the voltage and current driving of light emitting elements according to this exemplary embodiment, the bias voltage setting circuit 3014 is commonly provided for the respective light emitting elements. In order to suppress variation among the light emitting elements, the bias currents Ibias of all the light emitting elements are controlled based on the common bias voltage Vbias, but the bias currents Ibias are not individually controlled.

Therefore, the respective terminal voltages of the respective light emitting elements, which are applied by the bias voltage setting circuit 3014 are subjected to the averaging process as described above. The bias current Ibias common to the respective light emitting elements, which is set based on the bias voltage Vbias, is supplied to the respective light emitting elements.

However, since the respective terminal voltages of the respective light emitting elements, which are applied by the bias voltage setting circuit 3014, are subjected to the averaging process, an error may occur in the averaging process if no bias current Ibias flows through the light emitting elements to be brought into pause.

Accordingly, description will given on the configuration of this exemplary embodiment, which can solve the above issues.

Figure 12:
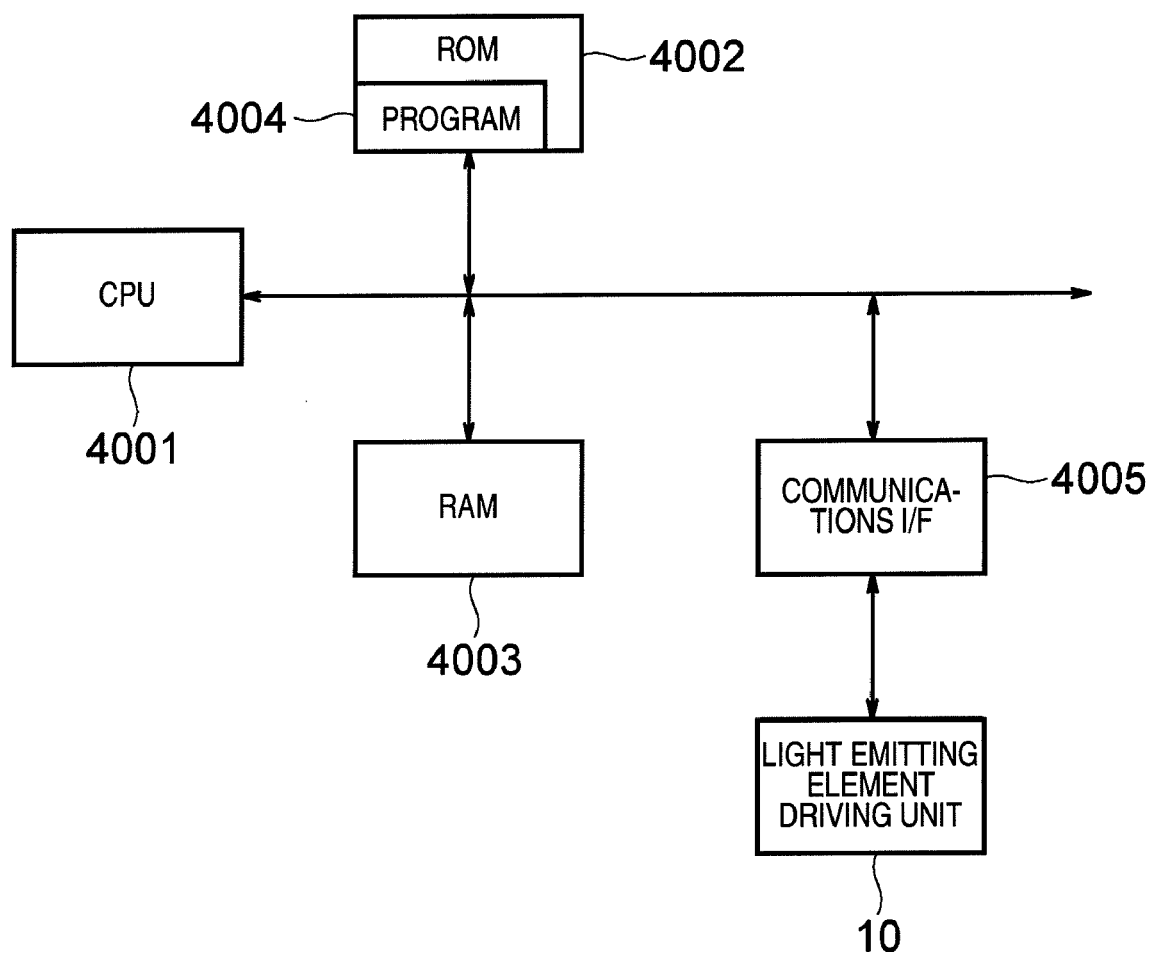
FIG. 12 is a block diagram showing electrical connections in a control system of the image forming apparatus according to the one exemplary embodiment of the present invention.

FIG. 12 is a block diagram showing electrical connections in a control system that controls the light emitting element driving unit 10.

The control system is configured so that a ROM 4002, a RAM 4003 and a communication interface (I/F) 4005 are connected to a CPU 4001 that intensively control respective sections. The ROM 4002 stores a control program 4004 executed by the CPU 4001 and fixed data. The RAM 4003 serves as a working area of the CPU 4001. The communications interface 4005 communicates with the light emitting element driving unit 10, etc.

The control program 4004 may be set up in the process of production of the image forming apparatus. However, the control program 4004 may be read later from a storage medium, such as a CD-ROM or a DVD-ROM (examples of a computer-readable medium) storing the control program 4004 therein, and be installed in a non-volatile memory or a magnetic memory. Alternatively, the control program 4004 may be downloaded in the form of carrier waves through a communications line such as the Internet and be installed in a non-volatile memory or a magnetic memory unit.

As described above, the light emitting elements of the vertical cavity surface light-emitting diodes are controlled by the complementary actions so that a driving current flows through the light emitting elements to be driven (that is, the light emitting elements used to form an image) with a bias current flowing through the load 105 at this time. Also, a bias current flows through the light emitting elements, which are not to be driven (that is, the light emitting elements not forming an image), with a driving current flowing through the load 105, at this time.

At this time, as described above, when some of the respective light emitting elements of the vertical cavity surface light-emitting laser diodes are brought into pause in some image formation mode, the CPU 4001 outputs the above-described disable signal (DSBL signal) to some of the respective drivers 100$_1$ through 100$_{32}$, which correspond to the light emitting elements to be brought into pause, in accordance with the image formation mode (see FIG. 4). The drivers that receive the DSBL signal cause a bias current to flow through the light emitting elements to be brought into pause regardless of the modulation signal and cause a driving current to flow through the load 105 by changing the internal switch thereof. That is, while the light emitting elements are in pause, the circuit shown in FIG. 7 or FIG. 10 is fixed so that, regardless of the modulation signal, the bias current is caused to flow through the light emitting elements and a driving current is caused to flow through the load 105. Therefore, since the bias current is supplied to the light emitting elements, which are not used to form an image, the light emitting elements are controlled so as not to produce any averaging error in averaging of the terminal voltages when the bias current is set. The bias current flowing through the light emitting elements to be brought into pause in this case is set to be equal to or less than the light-emitting threshold value of the light emitting elements. Therefore, there is no case where the light emitting elements to be brought into pause emit light.

What is claimed is:

1. An exposure device comprising:
a plurality of light emitting elements;
a load;
a first supplying unit that supplies a driving current to one of (i) light emitting elements which are used to form an image among the plurality of light emitting elements and (ii) the load, in accordance with a modulation signal, wherein the first supplying unit supplies a bias current to another one of (i) the light emitting elements which are used to form the image and (ii) the load;
a second supplying unit that supplies the bias current to light emitting elements which are not used to form the image among the plurality of light emitting elements, regardless of the modulation signal; and
a third supplying unit that supplies to the respective light emitting elements a bias voltage which is common to the plurality of light emitting elements and which is obtained by averaging voltages between terminals of the plurality of light emitting elements when the plurality of light emitting elements are turned off, wherein
after the bias voltage is supplied, the first supplying unit supplies the bias current, which is set based on the bias voltage, to the another one of (i) the light emitting elements which are used to form the image and (ii) the load, and
after the bias voltage is supplied, the second supplying unit supplies the bias current, which is set based on the bias voltage, to the light emitting elements which are not used to form the image among the plurality of light emitting elements, regardless of the modulation signal.

2. An image forming apparatus comprising:
a photosensitive body;
an exposure device having a plurality of light emitting elements that expose the photosensitive body to form an electrostatic latent image; and
a developer that develops the electrostatic latent image with a toner, wherein
the exposure device includes
an exposure section having the plurality of light emitting elements,
a load,
a first supplying unit that supplies a driving current to one of (i) light emitting elements which are used to form an image among the plurality of light emitting elements and (ii) the load, in accordance with a modulation signal, wherein the first supplying unit supplies a bias current to another one of (i) the light emitting elements which are used to form the image and (ii) the load,
a second supplying unit that supplies the bias current to light emitting elements which are not used to form the image among the plurality of light emitting elements, regardless of the modulation signal, and
a third supplying unit that supplies to the respective light emitting elements a bias voltage which is common to the plurality of light emitting elements and which is obtained by averaging voltages between terminals of the plurality of light emitting elements when the plurality of light emitting elements are turned off, wherein
after the bias voltage is supplied, the first supplying unit supplies the bias current, which is set based on the bias voltage, to the another one of (i) the light emitting elements which are used to form the image and (ii) the load, and
after the bias voltage is supplied, the second supplying unit supplies the bias current, which is set based on the bias voltage, to the light emitting elements which are not used to form the image among the plurality of light emitting elements, regardless of the modulation signal.

3. A computer-readable medium storing a program that causes a computer to function as:
a first supplying unit that supplies a driving current to one of (i) light emitting elements which are used to form an image among a plurality of light emitting elements and (ii) a load, in accordance with a modulation signal, wherein the first supplying unit supplies a bias current to another one of (i) the light emitting elements which are used to form the image and (ii) the load,
a second supplying unit that supplies the bias current to light emitting elements which are not used to form the image among the plurality of light emitting elements, regardless of the modulation signal, and
a third supplying unit that supplies to the respective light emitting elements a bias voltage which is common to the plurality of light emitting elements and which is obtained by averaging voltages between terminals of the plurality of light emitting elements when the plurality of light emitting elements are turned off, wherein
after the bias voltage is supplied, the first supplying unit supplies the bias current, which is set based on the bias voltage, to the another one of (i) the light emitting elements which are used to form the image and (ii) the load, and
after the bias voltage is supplied, the second supplying unit supplies the bias current, which is set based on the bias voltage, to the light emitting elements which are not used to form the image among the plurality of light emitting elements, regardless of the modulation signal.

* * * * *